(12) United States Patent
Luo et al.

(10) Patent No.: US 12,529,922 B2
(45) Date of Patent: Jan. 20, 2026

(54) DISPLAY DEVICE AND MEDICAL ENDOSCOPIC APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenqian Luo, Beijing (CN); Hetao Wang, Beijing (CN); Zhanchang Bu, Beijing (CN); Yuanye Chen, Beijing (CN); Peng Li, Beijing (CN); Weibiao Geng, Beijing (CN); Chunlei Xiao, Beijing (CN); Qian Cheng, Beijing (CN); Fanglin Li, Beijing (CN); Tianyi Feng, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 162 days.

(21) Appl. No.: 18/558,102

(22) PCT Filed: Apr. 2, 2022

(86) PCT No.: PCT/CN2022/085023
§ 371 (c)(1),
(2) Date: Oct. 30, 2023

(87) PCT Pub. No.: WO2023/184530
PCT Pub. Date: Oct. 5, 2023

(65) Prior Publication Data
US 2024/0219760 A1    Jul. 4, 2024

(51) Int. Cl.
G02F 1/1333    (2006.01)
A61B 1/00    (2006.01)
F21V 8/00    (2006.01)

(52) U.S. Cl.
CPC .... G02F 1/133317 (2021.01); A61B 1/00048 (2013.01); G02B 6/0085 (2013.01); G02F 1/133331 (2021.01); *G02F 2202/28* (2013.01)

(58) Field of Classification Search
CPC ......... G02F 1/133317; G02F 1/133331; G02F 2202/28; G02F 1/133308; G02F 1/133314;
(Continued)

(56) References Cited

U.S. PATENT DOCUMENTS 7,528,913 B2    5/2009   Kobayashi
2007/0268444 A1    11/2007   Azuma et al.
(Continued)

FOREIGN PATENT DOCUMENTS

CN    1632659 A    6/2005
CN    1881036 A    12/2006
(Continued)

OTHER PUBLICATIONS

English translation of Zhao CN-113759611-A (Year: 2021).*

*Primary Examiner* — Evan P Dzierzynski
(74) *Attorney, Agent, or Firm* — LEASON ELLIS LLP

(57) ABSTRACT

A display device and a medical endoscopic apparatus are provided. The display device includes: a display panel; a cover plate at a light exit side of the display panel; a backlight module, at a side of the display panel away from the cover plate; a middle frame, including: a first part, configured to support the display panel; a second part, connected with the first part and extends from the first part to the side away from the cover plate; the second part is
(Continued)

around the backlight module at side of the backlight module; the display device includes a first space between the first part and the cover plate, a first side of the first space is limited by the cover plate, a second side of the first space is limited by the first part, the first side is opposite to the second side of the first space.

19 Claims, 5 Drawing Sheets

(58) Field of Classification Search
CPC . G02F 1/1333; A61B 1/00048; G02B 6/0085; G02B 6/0088
See application file for complete search history.

(56) References Cited

U.S. PATENT DOCUMENTS

2008/0064922 A1* 3/2008 Uchida ............... H04N 23/12
348/E9.002
2013/0128612 A1* 5/2013 Que ................ G02F 1/133308
362/609
2017/0299913 A1* 10/2017 Choi ................... G02B 6/0088
2021/0033912 A1* 2/2021 Xiao ............... G02F 1/133322

FOREIGN PATENT DOCUMENTS

| | | | | |
|---|---|---|---|---|
| CN | 101075037 | A | 11/2007 | |
| CN | 103104868 | A | 5/2013 | |
| CN | 104641280 | A | 5/2015 | |
| CN | 207663184 | U | 7/2018 | |
| CN | 208255598 | U | 12/2018 | |
| CN | 111708206 | A | 9/2020 | |
| CN | 112068350 | A | 12/2020 | |
| CN | 113759611 | A * | 12/2021 | ........... G02F 1/1339 |
| KR | 102118653 | B1 | 6/2020 | |

* cited by examiner

DISPLAY DEVICE AND MEDICAL ENDOSCOPIC APPARATUS

CROSS-REFERENCE TO RELATED PATENT APPLICATIONS

This application is a U.S. National Stage Application under 35 U.S.C. § 371 of International Patent Application No. PCT/CN2022/085023, filed Apr. 2, 2022, which is incorporated by reference in its entirety.

TECHNICAL FIELD

Embodiments of the present disclosure relate to a display device and a medical endoscopic apparatus.

BACKGROUND

Liquid crystal displays (LCD) have the advantages of low radiation and lightness, and are widely used in the display field. Thin film transistor liquid crystal display (TFT-LCD) is widely used because of its high brightness and large viewing angle. A conventional TFT-LCD is composed of a backlight module, an upper polarizer, a liquid crystal display panel and a lower polarizer, and the liquid crystal display panel is arranged between the upper polarizer and the lower polarizer. The backlight module is arranged on a side of the lower polarizer away from the upper polarizer, and the light transmission axes of the upper polarizer and the lower polarizer are perpendicular to each other. The liquid crystal display panel includes an upper substrate, a lower substrate, a liquid crystal layer sandwiched between the upper substrate and the lower substrate, and spacer columns for maintaining a gap between the upper substrate and the lower substrate. The upper substrate includes a first electrode (e.g., a common electrode), a color filter, an upper alignment film and a black matrix, and the lower substrate includes scanning lines, data lines, storage capacitors, thin film transistors, a second electrode (e.g., a pixel electrode) and a bottom alignment film.

Liquid crystal displays are widely used in mobile phones, personal digital assistants, notebook computers and endoscopic devices for medical operations. As far as the medical operation endoscope device is concerned, when the user uses the medical operation endoscope device, it is required that the image quality of the displayer is uniform, the color is rich and the optical difference in different side orientations is small.

SUMMARY

At least one embodiment of the present disclosure provides a display device and a medical endoscopic apparatus, in the display device, the first part of the middle frame is configured to support the display panel, the second part is connected with the first part and extends from the first part to the side away from the cover plate, and the second part is around the backlight module at the side of the backlight module, so that the structure of the display device is more stable, thus in a case that the display device is used as an endoscopic display device for surgery, the diseased tissue of the patient can be accurately observed, the accuracy and efficiency of the operation are improved, the usage amount of glue is reduced, and the risk of deformation of the display device is reduced.

At least one embodiment of the present disclosure provides a display device, and the display device comprises: a display panel; a cover plate at a light exit side of the display panel; a backlight module, arranged at a side of the display panel away from the cover plate; a middle frame, in which the middle frame comprises: a first part, configured to support the display panel; a second part, connected with the first part and extends from the first part to the side away from the cover plate; the second part is around the backlight module at side of the backlight module; the display device further comprises a first space between the first part and the cover plate, a first side of the first space is limited by the cover plate, a second side of the first space is limited by the first part, the first side of the first space is opposite to the second side of the first space, and the first space is around the display panel; a first adhesive layer is provided between the cover plate and the display panel, and an orthographic projection of the first adhesive layer on the cover plate covers an orthographic projection of a display area of the display panel on the cover plate.

For example, in the display device provided by at least one embodiment of the present disclosure, a second space is further provided between the display panel and the cover plate, a first side of the second space is limited by the cover plate, a second side of the second space is limited by the display panel, the first side of the second space is opposite to the second side of the second space, and the second space is around the first adhesive layer; an orthographic projection of a peripheral area of the display panel on the cover plate covers an orthographic projection of the second space on the cover plate.

For example, in the display device provided by at least one embodiment of the present disclosure, the second space surrounds a circle of the first adhesive layer, and an average thickness of the first adhesive layer is in a range of [0.25 mm, 1.00 mm]; the thickness of the first adhesive layer is uniform everywhere.

For example, the display device provided by at least one embodiment of the present disclosure, further comprises an outer frame, in which the outer frame comprises a first support part and a second support part; the first support part and the display panel are on a same side of the cover plate, and the first support part and a first edge of the cover plate are bonded by a second adhesive; the second support part is connected with a side of the backlight module away from the display panel; the outer frame further comprises a main body part, the main body part is respectively connected with the first support part and the second support part, and the first support part and the second support part are respectively connected with the main body part and located at a same side of the main body part.

For example, in the display device provided by at least one embodiment of the present disclosure, the middle frame further comprises a third part, the third part is connected with the first part and extends from the first part to a side away from the cover plate, and the third part is closer to a center of the display device than the second part for limiting the backlight module; a space is provided between the second part and the third part.

For example, in the display device provided by at least one embodiment of the present disclosure, on a plane perpendicular to a main surface of the display panel, a cross-sectional shape of the first part and a cross-sectional shape of the third part constitute a shape of letter T, and the cross-sectional shape of the first part, the cross-sectional shape of the second part and the cross-sectional shape of the third part comprise an F-shaped part.

For example, in the display device provided by at least one embodiment of the present disclosure, the backlight module further comprises a light guide plate and an optical film, and the optical film is on a side of the light guide plate close to the cover plate; the first part is laminated with the optical film in a direction perpendicular to a main surface of the cover plate; the third part is at a side of the light guide plate close to the cover plate and is laminated with the light guide plate in the direction perpendicular to the main surface of the cover plate; the first part is immediately adjacent to the optical film, and the third part is immediately adjacent to the light guide plate.

For example, in the display device provided by at least one embodiment of the present disclosure, the backlight module comprises a back plate, and the back plate comprises a first sub back plate and a second sub back plate that are connected with each other, and the first sub back plate and the second part are immediately adjacent to each other.

For example, in the display device provided by at least one embodiment of the present disclosure, the backlight module further comprises a bottom plate, and the bottom plate is on a side of the second sub back plate away from the cover plate; the second sub back plate is connected with the bottom plate through a first connection component, and the second support part is fixedly connected with the bottom plate.

For example, in the display device provided by at least one embodiment of the present disclosure, the first sub back plate is between the third part and the light guide plate; the backlight module further comprises a backlight, and the backlight is between the light guide plate and the first sub back plate.

For example, in the display device provided by at least one embodiment of the present disclosure, a bracket is on a side of the second sub back plate away from the cover plate, and a power board is on a side of the bracket away from the second sub back plate, and the bracket is configured to support the power board, and the power board is configured to drive the display panel to display.

For example, in the display device provided by at least one embodiment of the present disclosure, the bracket and the second sub back plate are connected through a second connection component, and the bracket has a first main surface, and the second sub back plate has a second main surface, and an entirety of the first main surface is in contact with the second main surface.

For example, in the display device provided by at least one embodiment of the present disclosure, an adapter plate is further provided between the bracket and the power board, and the adapter plate is fixed on the bracket and bears the power board; an orthographic projection of the power board on the second sub back plate is within an orthographic projection of the adapter board on the second sub back plate; an electrostatic conduction path is formed between the adapter plate, the bracket and the second sub back plate.

For example, in the display device provided by at least one embodiment of the present disclosure, the second main surface of the second sub back plate is provided with a screw hole, the bracket is provided with a hole structure which is configured for a screw to pass through, and the second connection component is a combination of the screw and the screw hole.

For example, in the display device provided by at least one embodiment of the present disclosure, the backlight module comprises a light guide plate and a second sub back plate, in which the second sub back plate is located at a side of the light guide plate away from the second sub back plate; the backlight module further comprises a heat conduction component; the heat conduction component comprises a first sub heat conduction component extending parallel to the second sub back plate, and the first sub heat conduction component is between the second sub back plate and the light guide plate; the heat conduction component further comprises a second sub heat conduction component extending from an edge of the first sub heat conduction component toward the display panel, in which the first sub heat conduction component is attached to the second sub back plate; a backlight is on a side of the second sub heat conduction component close to the light guide plate.

For example, in the display device provided by at least one embodiment of the present disclosure, the heat conduction component further comprises a third sub heat conduction component, the third sub heat conduction component is between the first sub heat conduction component and the light guide plate and is respectively in contact with the first sub heat conduction component and the light guide plate; the third sub heat conduction component is configured to support the light guide plate; the heat conduction component comprises a first spacer part between the second sub heat conduction component and the third sub heat conduction component, and at least a part of the backlight is in the first spacer part.

For example, the display device provided by at least one embodiment of the present disclosure, further comprises a position limitation part fixed to the second sub back plate, in which the position limitation part extends along a direction towards the display panel; the first sub heat conduction component comprises a second spacer part, and the position limitation part extends into the second spacer part for limiting a position of the heat conduction component.

For example, in the display device provided by at least one embodiment of the present disclosure, the second spacer part penetrates the first sub heat conduction component in a thickness direction of the first sub heat conduction component; the heat conduction component further comprises a third spacer part penetrating the third sub heat conduction component in a thickness direction of the third sub heat conduction component, and the second spacer part and the third spacer part are connected with each other; a part of the position limitation part is in the second spacer part and a part of the position limitation part is in the third spacer part; in at least one direction parallel to a plane where the second sub back plate is located, a width of an orthographic projection of the part of the position limitation part in the third spacer part on the second sub back plate is greater than that of an orthographic projection of the second spacer part on the second sub back plate.

For example, in the display device provided by at least one embodiment of the present disclosure, a third direction is a direction from a sky side of the display device to a ground side of the display device; in the third direction, a width of the second spacer part is greater than a width of the part of the position limitation part in the second spacer part.

For example, in the display device provided by at least one embodiment of the present disclosure, the display device further comprises a buffer part, and the buffer part is between the first sub back plate which is on the sky side and the third sub heat conduction component corresponding to the sky side.

For example, in the display device provided by at least one embodiment of the present disclosure, the backlight module comprises a light guide plate and a second sub back plate, and the second sub back plate is at a side of the light guide plate away from the second sub back plate; the backlight source comprises a first backlight source and a second backlight source which are respectively at two opposite side surfaces of the light guide plate; the display device further comprises a sensor, and the sensor is configured to detect brightness of emitted light of the backlight module.

For example, in the display device provided by at least one embodiment of the present disclosure, the first backlight and the second backlight are independently controlled, and in a case where one of the first backlight and the second backlight does not work, it can be detected by the sensor; the display device is configured to automatically adjust brightness of other one of the first backlight and the second backlight so that the display device emits light normally.

For example, in the display device provided by at least one embodiment of the present disclosure, the backlight comprises a backlight circuit board and a light-emitting diode light source which is at a side of the backlight circuit board close to the light guide plate; the display device comprises a support column, and the support column is on the backlight circuit board and is arranged against the light guide plate for limiting a position of the light guide plate.

For example, in the display device provided by at least one embodiment of the present disclosure, the display panel comprises a color filter substrate and an array substrate that are assembled into a cell, and a liquid crystal layer sandwiched between the color filter substrate and the array substrate; the display panel further comprises a +A compensation layer and a +C compensation layer that are laminated, and the +A compensation layer is closer to the liquid crystal layer than the +C compensation layer; the display panel further comprises a first polarizer and a second polarizer, and the liquid crystal layer, the +A compensation layer and the +C compensation layer are all between the first polarizer and the second polarizer.

For example, in the display device provided by at least one embodiment of the present disclosure, a material of the back plate comprises aluminum; on the second sub back plate, a reinforcing rib is close to each side edge of the second sub back plate, and a shape of each reinforcing rib is a strip extending along a corresponding side edge of the second sub back plate, and adjacent reinforcing ribs are not in contact with each other.

For example, in the display device provided by at least one embodiment of the present disclosure, a second reinforcing structure is arranged on the second sub back plate, and the reinforcing rib is around the second reinforcing structure, and a shape of each second reinforcing structure on a plane parallel to a main surface of the bottom plate has an arc chamfer.

For example, in the display device provided by at least one embodiment of the present disclosure, the first part comprises a first sub part and a second sub part, the first sub part and the second sub part are in different planes; the second sub part is closer to the cover plate than the first sub part; the first sub part is configured to support the display panel.

For example, in the display device provided by at least one embodiment of the present disclosure, a size of the display panel is greater than or equal to 27 inches.

At least one embodiment of the present disclosure further comprises a medical endoscopic apparatus, and the medical endoscopic apparatus comprises any one of the display device mentioned.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
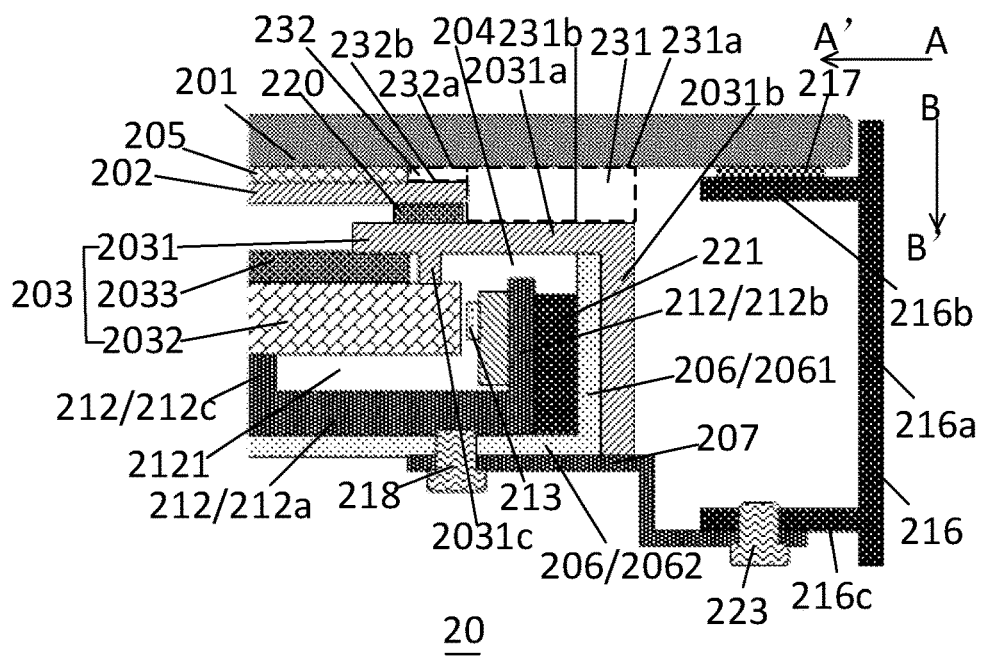
FIG. 1 is a schematic cross-sectional structure diagram of a display device provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

The medical endoscopic display included in a display device is mainly used in the operating room. When a doctor performs an endoscopic surgery, the doctor needs to observe the diseased tissue of the patient in real time, so as to cut and suture the diseased tissues. In order to ensure the accuracy and efficiency of the surgery operation, it is necessary to make the medical endoscopic display with uniform picture quality, real and rich colors and timely picture response. In the actual surgery operation process, the surgery operation is generally operated by several people, which requires that the optical difference of the medical endoscopic display in different side orientations is small, and when static electricity accumulates on the medical endoscopic display during the surgery operation process, the phenomenon of black screen or flashing screen is not allowed. In addition, in order to disinfect the surface of the medical endoscopic display conveniently, it is required to attach a glass cover plate to the medical endoscopic display, so that it is convenient to disinfect and wipe the surface of the medical endoscopic display without affecting the internal structure of the medical endoscopic display. Moreover, the medical endoscopic display has a high frequency of use and will be aging if used for a long time, so it is necessary for the medical endoscopic display to have a long service life.

The inventor of the present disclosure found that there is an air layer between the display module and the cover plate in a structure where the display module and the cover plate are bonded through a frame, and the air layer will refract the light incident therein, resulting in low light transmittance, which increases the power consumption of the display device. Therefore, the way of fully bonding the display module and the cover plate can be considered.

In the structure of a common display device, there is usually an iron frame for fixing, and the large-size display with the iron frame is fully attached to a protection cover plate. Because of a structural segment difference is between the iron frame and the display panel, it is necessary to use the first glue to fill the gap and fill the display panel with liquid glue. And in the usual design, the distance between the iron frame and the upper polarizer of the display panel is 1.6 mm, the thickness of the whole glue for attaching the display and the protection cover plate is 2.7 mm, and the usage amount of the liquid glue is 2.45 L. The glue thickness of the first glue corresponding to the iron frame part is different from that of the first glue corresponding to the display panel, so that there is a step-shaped transition zone.

The inventor of the present disclosure found that the internal structure of the display device can be changed, the iron frame can be removed and the structural design of the middle frame can be changed, which can reduce the usage amount of glue, and meanwhile, avoids the deformation influence caused by excessive glue on the display panel and the light leakage of the display panel; by arranging a first part of the middle frame to support the display panel, connecting a second part of the middle frame with the first part, and because the second part extends from the first part to the side away from the cover plate and the second part is around the backlight module at the side of the backlight module, the structure of the display device is more stable. Further, in the case that the display device is used in the medical field, especially used as an endoscopic display device for surgery, it can accurately observe the diseased tissue of the patient, so as to improve the accuracy and efficiency of the surgery.

At least one embodiment of the present disclosure provides a display device, the display device includes: a display panel, a cover plate at the light exit side of the display panel, a backlight module and a middle frame; the backlight module is arranged at the side of the display panel away from the cover plate; the middle frame comprises a first part and a second part, the first part is configured to support the display panel; the second part is connected with the first part and extends from the first part to the side away from the cover plate; the second part is around the backlight module at side of the backlight module; the display device further comprises a first space between the first part and the cover plate, a first side of the first space is limited by the cover plate, a second side of the first space is limited by the first part, and the first side of the first space is opposite to the second side of the first space.

For example, in an example, the middle frame further comprises a third part, the third part is connected with the first part and extends from the first part to the side away from the cover plate, and the third part is closer to the center of the display device than the second part for limiting the position of the backlight module; and a space is provided between the second part and the third part, the middle frame of the display device is provided with the first part, the second part and the third part, so that the structure of the display device is more stable and the reliability of the display device is improved. Further, in the case that the display device is used in the medical field, it can meet the requirements of high reliability.

For example, FIG. 1 is a schematic cross-sectional structure diagram of a display device provided by an embodiment of the present disclosure. As shown in FIG. 1, the display device 20 includes a display panel 202, a cover plate 201 located at the light exit side of the display panel 202, a backlight module 203 and a middle frame 2031; the backlight module 203 is arranged on the side of the display panel 202 away from the cover plate 201; the middle frame 2031 includes a first part 2031$a$ and a second part 2031$b$, the first part 2031$a$ is configured to support the display panel 202; the second part 2031$b$ is connected to the first part 2031$a$ and extends from the first part 2031$a$ to the side away from the cover plate 201; the second part 2031$b$ is around the backlight module 203 at side of the backlight module 203; the display device 20 further includes a first space 231 between the first part 2031$a$ and the cover plate 201, a first side 231$a$ of the first space 231 is limited by the cover plate 201, and a second side 231$b$ of the first space 231 is limited by the first part 2031$a$, and the first side 231$a$ of the first space 231 is opposite to the second side 231$b$ of the first space 231, and the first space 231 is around the display panel; a first adhesive layer 205 is provided between the cover plate 201 and the display panel 202, and an orthographic projection of the first adhesive layer 205 on the cover plate 201 covers an orthographic projection of the display area of the display panel 202 on the cover plate 201. The structure of the display device 20 is more stable, and meanwhile, the display device 20 can avoid the deformation influence caused by excessive glue on the display panel and avoid the light leakage of the display panel. Therefore, in the case that the display device 20 is used in the medical field, especially used as an endoscopic display device in surgery, it can accurately observe the diseased tissue of the patient, improve the accuracy and efficiency of the surgery, reduce the usage amount of glue and reduce the risk of deformation of the display device.

It should be noted that the shape of the display panel 202 on the plane where the light exit surface is located may include a rectangle or a rounded rectangle; the feature that the first space 231 is around the display panel means that the first space 231 is arranged at least at two side surfaces of the display panel 202, and the side surfaces of the display panel 202 are four side surfaces other than the light exit surface of the display panel 202 and the surface opposite to light exit surface (for example, the light entrance surface). Preferably, the first space 231 surrounds a circle of the display panel 202, which means that the first space 231 is located at all side surfaces of the display panel 202; for example, the first space 231 forms a closed annular space; for example, the first space 231 is provided at all locations except the boundary of different side surfaces.

Figure 2:
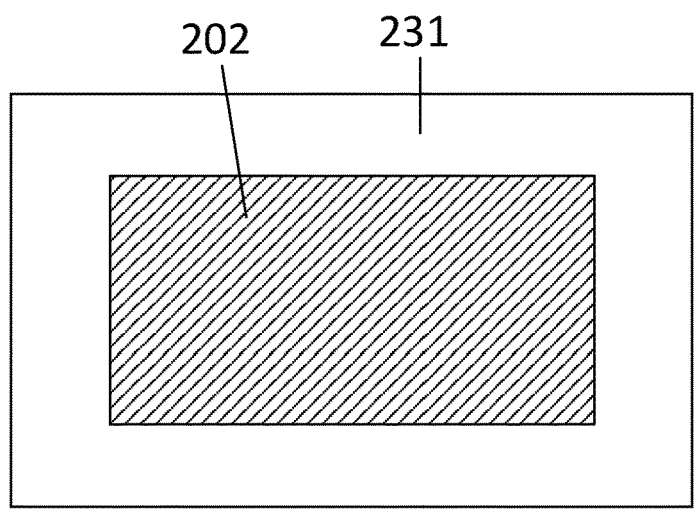
FIG. 2 is a schematic planar view of a structure with a first space around the display panel provided by at least one embodiment of the present disclosure.

For example, FIG. 2 is a schematic planar view of a structure with a first space around the display panel provided by at least one embodiment of the present disclosure. As shown in FIG. 2, the first space 231 surrounds four side surfaces of the display panel 202 to form a closed surrounding space. In a variation of FIG. 2, the first space 231 may only surround two or three side surfaces of the display panel 202 to form a semi-enclosed area.

It should be noted that the term "side surface" of the feature that the second part 2031b is around the side surface of the backlight module 203 refers to surfaces other than the light exit surface of the backlight module 203 and the surface opposite to the light-emitting surface.

For example, as shown in FIG. 1, the backlight module 203 includes a light guide plate 2032 and an optical film 2033. The middle frame 2031 includes a first part 2031a, a second part 2031b and a third part 2031c that are respectively connected with the first part 2031a. The first part 2031a is configured to support the display panel 202, and the second part 2031b extends from the first part 2031a to the side away from the cover plate 201. The second part 2031b and the third part 2031c are located at the same side of the first part 2031a, and a gap 204 is between the second part 2031b and the third part 2031c. The optical film 2033 is arranged on the side of the light guide plate 2032 close to the cover plate 201. The first part 2031a is laminated with the optical film 2033 in the direction perpendicular to the main surface of the cover plate 201, the third part 2031c is laminated with the light guide plate 2032 on the side of the light guide plate 2032 close to the cover plate 201 in the direction perpendicular to the main surface of the cover plate 201, and the third part 2031c is closer to the center of the display device 20 than the second part 2031b for limiting the position of the backlight module 203. In the display device 20, the first part 2031a of the middle frame 2031 is laminated with the optical film 2033 in the direction perpendicular to the main surface of the cover plate 201, and the third part 2031c of the middle frame 2031 is arranged on the side of the light guide plate 2032 close to the cover plate 201 and laminated with the light guide plate 2032 in the direction perpendicular to the main surface of the cover plate 201, so that the structure of the display device 20 is more stable, and thereby in the case that the display device is used in the medical field, especially as an endoscopic display device, it has high reliability.

For example, as shown in FIG. 1, the optical film 2033 is arranged on the side of the light guide plate 2032 close to the cover plate 201; the first part 2031a is laminated with the optical film 2033 in the direction perpendicular to the main surface of the cover plate 201; the third part 2031c is on the side of the light guide plate 2032 close to the cover plate 201 and is laminated with the light guide plate 2032 in the direction perpendicular to the main surface of the cover plate 201; the first part 2031a is immediately adjacent to the optical film 2033, and the third part 2031c is immediately adjacent to the light guide plate 2032.

For example, as shown in FIG. 1, a second space 232 is further provided between the display panel 202 and the cover plate 201, a first side 232a of the second space 232 is limited by the cover plate 201, a second side 232b of the second space 232 is limited by the display panel 202, the first side 232a of the second space 232 is opposite to the second side 232b of the second space 232, and the second space 232 surrounds the first adhesive layer 205, and the orthographic projection of the peripheral area of the display panel 202 on the cover plate 201 covers the orthographic projection of the second space 232 on the cover plate 201.

It should be noted that the feature that the second space 232 surrounds the first adhesive layer 205 means that the second space 232 at least surrounds a thickness accumulation surface of the first adhesive layer 205. Preferably, the second space 232 surrounds a circle of the first adhesive layer 205. The definitions of "surrounds a circle" and "surrounds or around" respectively correspond to the definitions of "the first space 231 surrounds a circle of the display panel 202" and the definitions of "the first space 231 surrounds (or arounds) the display panel 202". The arrangement of the second space 232 around the first adhesive layer 205 can further reduce the usage amount of the glue, reduce the deformation of the display panel caused by the glue distribution, and avoid light leakage.

For example, in an example, the second space 232 surrounds a circle of the first adhesive layer 205, and an average thickness of the first adhesive layer 205 is in the range of [0.25 mm, 1.00 mm], and within this range, the bonding effect of the first adhesive layer is good, and the deformation of the display panel caused by the first adhesive layer is small. Preferably, the average thickness of the first adhesive layer 205 is 0.50 mm. Preferably, the thickness of the first adhesive layer 205 is uniform everywhere. It should be noted that the uniform thickness of the first adhesive layer may refer to that the thickness difference between the thickest part and the thinnest part of the first adhesive layer 205 is less than or equal to 0.10 mm.

For example, as shown in FIG. 1, the display panel 202 and the backlight module 203 are connected by a cushion 220 with adhesive on both sides; the cushion 220 provides a buffer space for the display panel 202 and the backlight module 203 along the direction perpendicular to the main surface of the display panel 202.

For example, the cover plate 201 and the first part 2031a are not directly bonded with the glue, that is, the display panel 202 and the cover plate 201 may be bonded only in a small area, and there is no need to coat adhesive on the cover plate 201 in a large area, so that the usage amount of the glue can be reduced and the process cost can be reduced.

For example, as shown in FIG. 1, the cover plate 201 and the display panel 202 are bonded by a first adhesive layer 205. The first adhesive layer 205 may be liquid glue or solid glue, and the embodiments of the present disclosure impose no limitation to this. The first adhesive layer 205 with appropriate viscosity can be selected according to requirements, so that the adhesive force between the cover plate 201 and the display panel 202 can meet appropriate requirements.

It should be noted that the feature that the cover plate 201 and the display panel 202 are bonded by a first adhesive layer 205 refers to the bonding between surfaces, and at least ⅔ of the area of the main surface of the display panel 202 is bonded to the cover plate 201, which is different from the case of bonding by a frame, and the case of bonding by a frame is only bonded in the peripheral area between the two structures bonded with each other.

For example, the cover plate 201 may be an ordinary glass plate. In the case that the display device 20 is used in an environment of an operating room, the internal structure of the display device can be protected during the process of frequent disinfection and wiping.

For example, as shown in FIG. 1, the first part 2031*a* and the third part 2031*c* constitute a shape of a letter T. The third part 2031*c* extends from the middle area of the first part 2031*a* towards the light guide plate 2032, instead of extending towards the light guide plate 2032 at the edge of the first part 2031*a*, so that the first part 2031*a*, the third part 2031*c* and the light guide plate 2032 constitute an accommodation space which is unclosed at the side for placing the optical film 2033, and the third part 2031*c* is in direct contact with the light guide plate 2032 so that the structure of the entire display device 20 is more stable, thereby in the case that the display device 20 is used in the environment of the operating room, the stability of the structure is required to be higher, and the embodiments of the present disclosure is more suitable for the harsh application requirements in the operating room.

For example, as shown in FIG. 1, the cross-sectional shape formed by the first part 2031*a*, the second part 2031*b* and the third part 2031*c* includes an F-shaped part, and the cross-sectional shape is formed by cutting the backlight module 203 along a direction from top to bottom of the main surface of a horizontally placed base substrate, and the second part 2031*b* extends from the edge position of the first part 2031*a* to the side away from the first part 2031*a*, in this way, other structures of the backlight module 203 except the peripheral frame can be all limited within the area defined by the middle frame 2031, thus making the structure of the backlight module 203 more compact, and finally reducing the volume of the display device 20.

It should be noted that the second part 2031*b* may not extend from the edge position of the first part 2031*a* to the side away from the first part 2031*a*, but may also extend from a non-edge position of the first part 2031*a* to the side away from the first part 2031*a*, that is, the first part 2031*a* and the second part 2031*b* constitute a shape of the letter T, and this cross-sectional shape is a cross-sectional shape that formed by cutting the backlight module 203 along a direction from top to bottom of the main surface of a horizontally placed base substrate, that is, the cross-sectional shape formed by the first part 2031*a*, the second part 2031*b* and the third part 2031*c* may not include an F-shaped part, but may be considered as including an F-shaped part.

For example, as shown in FIG. 1, the first part 2031*a* is adjacent to the optical film 2033, in one example, the first part 2031*a* is in direct contact with the optical film 2033, and the third part 2031*c* is in direct contact with the light guide plate 2032. With this structural design, the edge of the optical film 2033 can be clamped in an unsealed accommodation space formed by the first part 2031*a*, the third part 2031*c* and the light guide plate 2032, and the surface of the optical film 2033 close to the display panel 202 abuts against the first part 2031*a* of the middle frame 2031, the surface of the optical film 2033 away from the display panel 202 abuts against the light guide plate 2032, and the surface of the third part 2031*c* of the middle frame 2031 away from the display panel 202 also abuts against the light guide plate 2032, thus forming a stable and compact backlight module structure.

For example, as shown in FIG. 1, there is a space area between the optical film 2033 and the third part 2031*c* of the middle frame 2031, so that the optical film 2033 has an expansion space when it is expanded by heat.

For example, the optical film 2033 is configured to guide light emitted by the backlight source onto the optical film 2033 into the display panel 202 to provide the backlight for the display panel 202.

For example, in one example, the optical film 2033 includes a brightness enhancement layer (not shown), and the brightness enhancement layer is configured to improve the brightness of the backlight module 203.

For example, in another example, the optical film 2033 further includes a haze adjustment layer (not shown in the figure) disposed on the side of the brightness enhancement layer away from the light guide plate 2032, and the haze adjustment layer is configured to adjust the haze of the backlight module 203, thereby improving the haze of the display device 20.

For example, as shown in FIG. 1, the backlight module 203 includes a back plate 206, the back plate includes a first sub back plate 2061 and a second sub back plate 2062 that are connected with each other, and the first sub back plate 2061 and the second part 2031*b* are attached to each other, thereby reinforcing the backlight module 203 on the side surface to make the structure of the backlight module 203 more stable.

For example, as shown in FIG. 1, the outer frame 216 includes a main body part 216*a*, a first support part 216*b* and a second support part 216*c*. The backlight module 203 further includes a bottom plate 207 disposed on the side of the back plate 206 away from the cover plate 201, and the bottom plate 207 is disposed on the side of the second sub back plate 2062 away from the cover plate 201. The second sub back plate 2062 is connected with the back plate 207 through a first connection component 218, and the second support part 216*c* is fixedly connected with the bottom plate 207, so as to reinforce the backlight module 203 on the bottom surface, and further make the structure of the backlight module 203 more stable, without causing the finally formed display device 20 to shake during use and affecting the display effect of the display device 20.

For example, in one example, there may be no interaction force between the second part 2031*b* and the bottom plate 207.

For example, in one example, there may be an interaction force between the first sub back plate 2061 (back plate flange) and the first part 2031*a*.

In a specific embodiment, the extension direction from the connection position between the first part 2031*a* and the second part 2031*b* to the connection position between the first part 2031*a* and the third part 2031*c* is the first direction A-A', and the extension direction of the second part 2031*b* is the second direction B-B'. For example, the first direction A-A' intersect the second direction B-B', and in one example, the first direction A-A' is perpendicular to or substantially perpendicular to the second direction B-B'.

For example, as shown in FIG. 1, the outer frame 216 includes a main body part 216*a*, a first support part 216*b* and a second support part 216*c*, the main body part 216*a* is respectively connected with the first support part 216*b* and the second support part 216*c*, and the first support part 216*b* and the second support part 216*c* are respectively connected with the main body part 216*a* and are located at the same side of the main body part 216*a*. The first support part 216*b* and the display panel 202 are located at the same side of the cover plate 20, the main body part 216*a* extends along the second direction B-B', and the first support part 216*b* and the second support part 216c extend from the main part 216a towards the backlight module 203 along the first direction A-A'.

For example, as shown in FIG. 1, the first support part 216b and the first edge of the cover plate 201 are bonded by a second adhesive 217, and the second support part 216c is connected with the side of the backlight module 203 away from the display panel 202 to support the cover plate 201. The second adhesive 217 may be liquid glue or solid glue, for example, double-sided adhesive tape with a release film, as long as the first support part 216b and the cover plate 201 can be bonded, the embodiments of the present disclosure impose no limitation to this.

For example, as shown in FIG. 1, the second support part 216c and the bottom plate 207 are connected by a third connection component 223, the connection component may be a combination of a nut and a screw, or a riveting structure, or a clamping structure of a combination of a stopper block and a clamping groove, which is not limited by the embodiments of the present disclosure.

Figure 8:
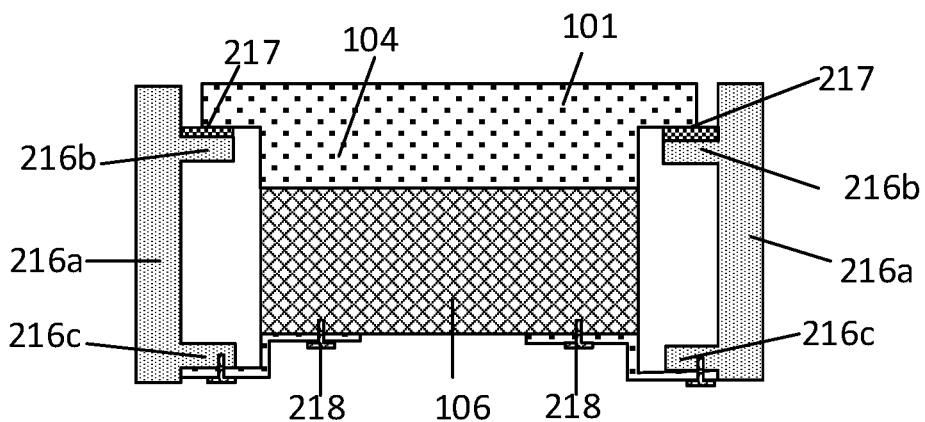
FIG. 8 is a schematic diagram of the cross-sectional structure of a display device provided by an embodiment of the present disclosure.

For example, FIG. 8 is a schematic diagram of the cross-sectional structure of a display device provided by an embodiment of the present disclosure, and the structure shown in FIG. 8 is a schematic diagram of the overall structure of the display device. As shown in FIG. 8, the protective cover 101 and the display panel 104 are integrated into a whole, and the outer frame 216 is on two sides of the backlight module 106, and the outer frame 216 includes a main body part 216a, a first support part 216b and a second support part 216c, the first support part 216b is located on the same side of the cover plate 201 as the display panel 202, and the first edge of the first support part 216b and the cover plate 201 are bonded on the two sides by the second adhesive 217, so as to support the cover plate 201. The second support part 216c and the bottom plate 207 are connected by a third connection component 223. The outer frame 216 plays a role of reinforcing the whole structure formed by the cover plate 101, the display panel 104 and the backlight module 106, and improves the reliability of the display device.

For example, in one example, the bottom plate is Z-shaped, and the outer frame 216, as an appearance component of the whole machine, needs to include devices such as the system board of the whole machine in the direction of Z, which will be thicker than the display module, so the Z-shaped structure is used to make up for the size difference.

It should be noted that because the thickness of the adhesive layer is in the range of [0.25 mm, 1.00 mm], in the case that the size of the display panel 202 (the diagonal length of the display area) is more than 27 inches, the adhesive 205 between the cover plate 201 and the display panel 202 may not be enough to bear the weight of the backlight module 203, and in this case, the outer frame 216 is used for auxiliary support to ensure the reliability of the display device.

It should be noted that the first connection component 208 may be a combination of a nut and a screw, or a riveting structure, or a clamping structure of a combination of a stopper block and a clamping groove, which is not limited by the embodiments of the present disclosure.

For example, as shown in FIG. 1, the first sub back plate 2061 is located between the third part 2031c and the light guide plate 2032, and the backlight module 203 further includes a backlight source, the backlight source is located between the light guide plate 2032 and the first sub back plate 2061.

It should also be noted that the circuit structure on the second sub back plate 2062 are not shown on the surface of the second sub back plate 2062 close to the display panel 202 in FIG. 1, and the circuit structure on the second sub back plate 2062 will be described in detail with reference to FIG. 3a to FIG. 3c. This circuit structure may be located in a part of the structure of the second sub back plate 2062 shown in FIG. 1 or in a part of the structure of the second sub back plate 2062 not shown in FIG. 1.

Figure 3A:
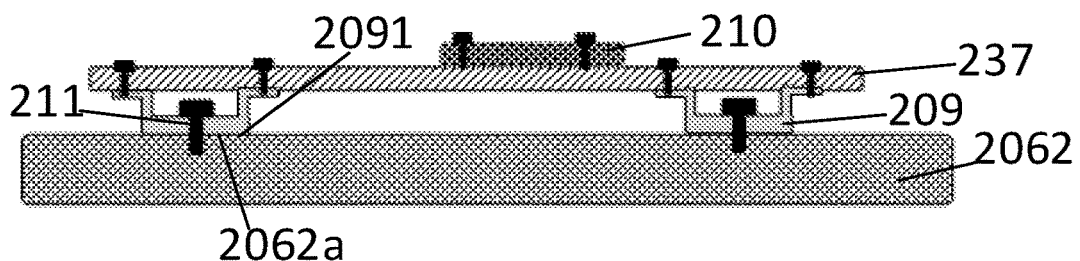
FIG. 3a is a schematic cross-sectional structure diagram of a second sub back plate provided by an embodiment of the present disclosure.
Figure 3B:
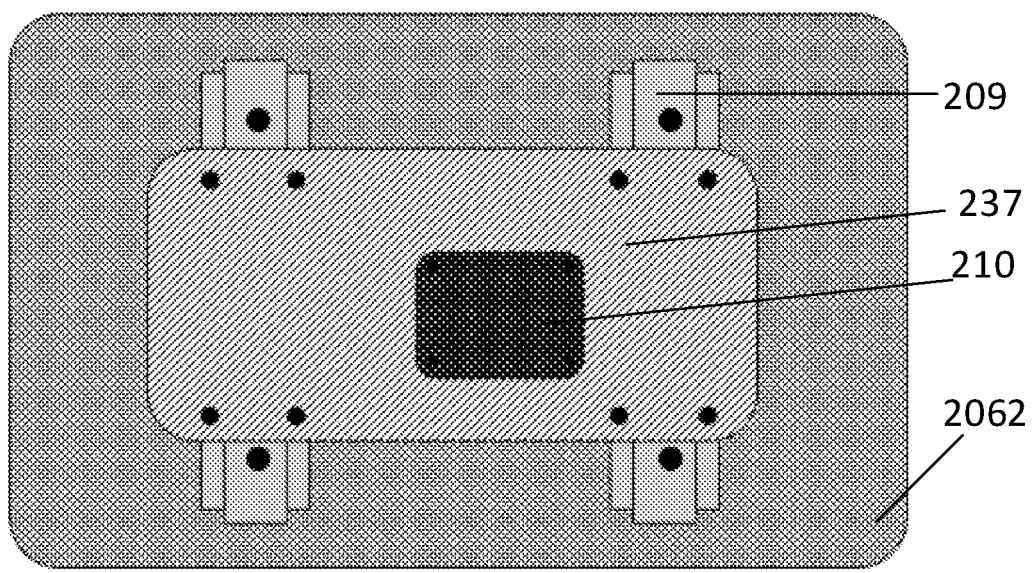
FIG. 3b is a schematic planar overlook view of a second sub back plate provided by an embodiment of the present disclosure.

For example, FIG. 3a is a schematic cross-sectional structure diagram of a second sub back plate provided by an embodiment of the present disclosure, and FIG. 3b is a schematic planar overlook view of a second sub back plate provided by an embodiment of the present disclosure. As shown in combination with FIG. 1, FIG. 3a and FIG. 3b, a bracket 209 is arranged on the side of the second sub back plate 2062 close to the cover plate 201, and a power board 210 is arranged on the side of the bracket 209 away from the second sub back plate 2062. The bracket 209 is configured to support the power board 210, and the bracket 209 is configured to drive the display panel 202 to display, that is, the power board 210 can provide a driving signal for driving the display panel 202 to display.

For example, as shown in FIG. 3a, the bracket 209 and the second sub back plate 2062 are connected by a second connection component 211, the second connection component 211 is a combination of a screw and a screw hole, and the bracket 209 has a first main surface 2091, and the second sub back plate 2062 has a second main surface 2062a, the entire first main surface 2091 is in contact with the second main surface 2062a. For example, in FIG. 3a, the entire first main surface 2091 in contact with the second main surface 2062a means that the first main surface 2091 of the bracket 209 is completely attached to the second main surface 2062a of the second sub back plate 2062, rather than partially attached.

For example, as shown in FIG. 3a, an adapter plate 237 is further provided between the bracket 209 and the power board 210. The adapter plate 237 is fixed on the bracket 209 and bears the power board 210. The orthogonal projection of the power board 210 on the second sub back plate 2062 is within the orthogonal projection of the adapter board 237 on the second sub back plate 2062, and an electrostatic conduction path is formed between the adapter board 237, the bracket 209 and the second sub back plate 2062. The electrostatic conduction path can lead the electricity on the power board to the ground through the back plate, so as to prevent interference to the display image.

For example, in FIG. 3a, the power board 210 and the adapter board 237 are fixedly connected by a combination of a screw and a screw hole, and the adapter board 237 and the bracket 209 are also fixedly connected by a combination of a screw and a screw hole.

For example, FIG. 3b is a schematic planar view of the case that the main surface of the second sub back plate is parallel to the horizontal plane. As shown in FIG. 3b, the bracket 209 is in a shape of a long strip, and the orthographic projection of the power board 210 on the second sub back plate 2062 is within the orthographic projection of the adapter board 237 on the second sub back plate 2062.

Figure 3C:
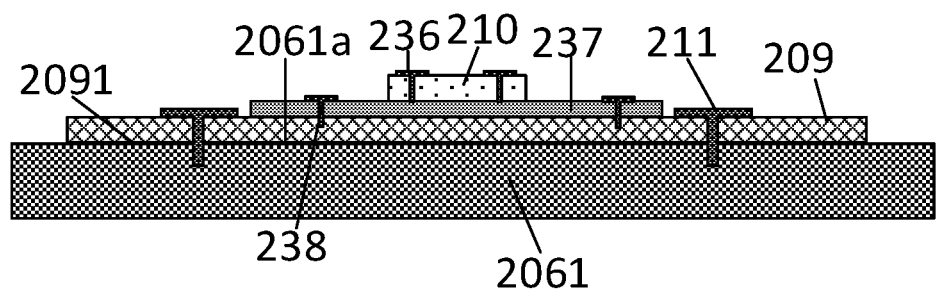
FIG. 3c is a left side view of a first sub back plate provided by an embodiment of the present disclosure.

For example, FIG. 3c is a left side view of a first sub back plate provided by an embodiment of the present disclosure. As shown in FIG. 3c, a power board 210 is arranged on the side of the bracket 209 away from the first sub back plate 2061, and the bracket 209 is configured to support the power board 210, the power board 210 is configured to drive the display panel 202 to display, that is, the power board 210 can provide the driving signal for driving the display panel 202 to display. The first main surface 2061a of the first sub back plate 2061 includes a concave part 2061b close to the main surface of the bracket 209, and a screw hole for fixing the screw is arranged in the concave part 2061b, a hole structure configured for the screws to pass through is arranged on the bracket 209, and the combination of the screw and the screw hole can facilitate the disassembly and assembly of the display device.

For example, as shown in FIG. 3c, the surface of the screw hole is not on the same surface as the surface of the first sub back plate 2062 close to the cover plate 201, so that the surface of the bracket 209 can be attached to the surface of the first sub back plate 2061, that is, the first main surface 2091 of the bracket 209 can be attached to the second main surface 2092 of the first sub back plate 2061, thereby increasing the contact area between the bracket 209 and the first sub back plate 2061. Moreover, both the bracket 209 and the first sub back plate 2061 are made of a conductive metal material, so that the static electricity generated by the power board 210 can be quickly released.

It should be noted that the connection mode of the first sub back plate 2061 and the bracket 209 is not limited to the combination of the above-mentioned screw and screw hole, and the first sub back plate 2061 and the bracket 209 may also be connected by riveting. For specific settings, please refer to the conventional riveting structure, which is not limited by the embodiments of the present disclosure.

It should also be noted that the surface of the usual backlight module is galvanized steel plate, and the surface smoothness of the surface of the usual backlight module is very low and the conductivity of the surface of the usual backlight module is relatively poor. In addition, in the usual backlight module, the bracket and the back plate are only connected through the screw and screw hole, so there is an obvious gap, that is, the bracket and the back plate are not attached face to face, and the contact area between the bracket and the back plate is small, which is not conducive to the release of static electricity caused by the power board on the bracket. In the embodiment of the present disclosure, for example, metallic aluminum is used to form the back plate, the metallic aluminum has good conductivity and is easy to discharge static electricity, and the bracket and the back plate are connected in a face-to-face contact way in which the entire surface is contact with another surface, so that the contact area between the bracket and the back plate is large, and the structure adopting the face-to-face contact way in which the entire surface is contact with another surface is more fixed.

Figure 4:
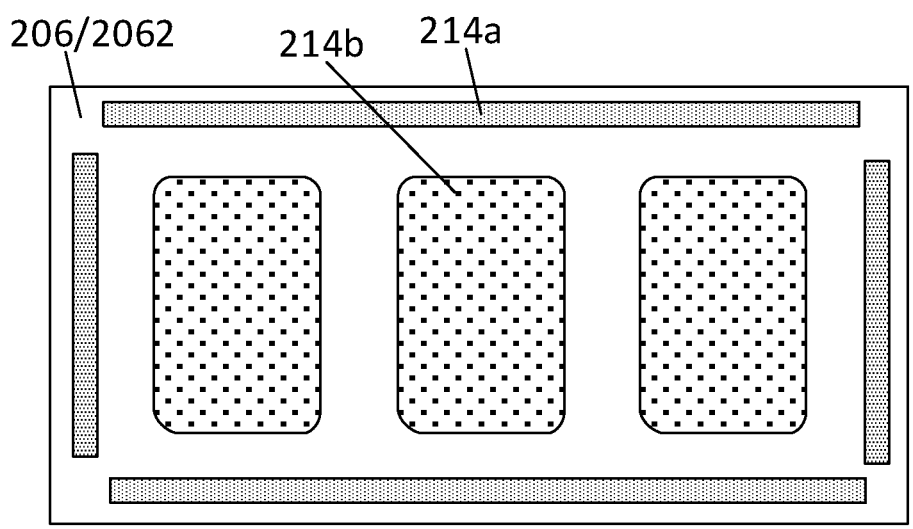
FIG. 4 is a schematic planar view of a back plate provided by an embodiment of the present disclosure.

For example, in one example, the material of the back plate 206 includes aluminum. For example, FIG. 4 is a schematic planar view of a back plate provided by an embodiment of the present disclosure. As shown in FIG. 4, the planar structure of the first sub back plate 2062 included in the back plate 206 is taken as an example to explain. On the second sub back plate 2062, positions adjacent to each side of the second sub back plate 2062 is provided with a reinforcing rib, and the periphery at four sides of the second sub back plate 2062 is provided with reinforcing ribs. The shape of each of the reinforcing ribs 214a is a long strip extending along the corresponding side of the second sub back plate 2062, and adjacent reinforcing ribs 214a are not in contact with each other. This reinforcing ribs can improve the deformation resistance of the display device 20, and make the structure of the whole display device 20 more stable, so that the display device can better adapt to the harsh application conditions in the operation room.

For example, as shown in FIG. 4, each side of the second sub back plate 2062 is provided with the reinforcing ribs, and the plane shape of each of the reinforcing ribs is long, and adjacent reinforcing ribs are disconnected, so as to improve the back plate strength.

For example, as shown in FIG. 4, second reinforcing structures 214b are arranged on the second sub back plate 2062, and the reinforcing ribs 214a are around the second reinforcing structures 214b, and the shape of each of the second reinforcing structures 214b on a plane parallel to the main surface of the back plate 207 has an arc chamfer.

For example, the size of the display panel is greater than or equal to 27 inches, and this size 27 inches means that the diagonal length of the display area of the display panel is 27 inches.

It should be noted that the first sub back plate 2061 included in the back plate 206 also has a similar reinforcement structure as the second sub back plate 2062 mentioned above. For details, please refer to the relevant descriptions mentioned above, which are not be repeated herein.

Figure 6:
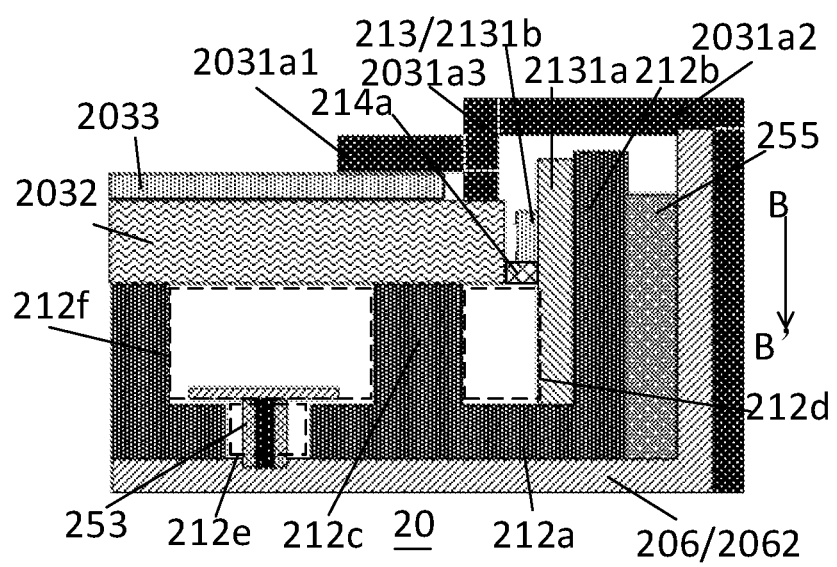
FIG. 6 is a schematic cross-sectional view of a backlight module at the side where a first backlight is located provided by an embodiment of the present disclosure.
Figure 7:
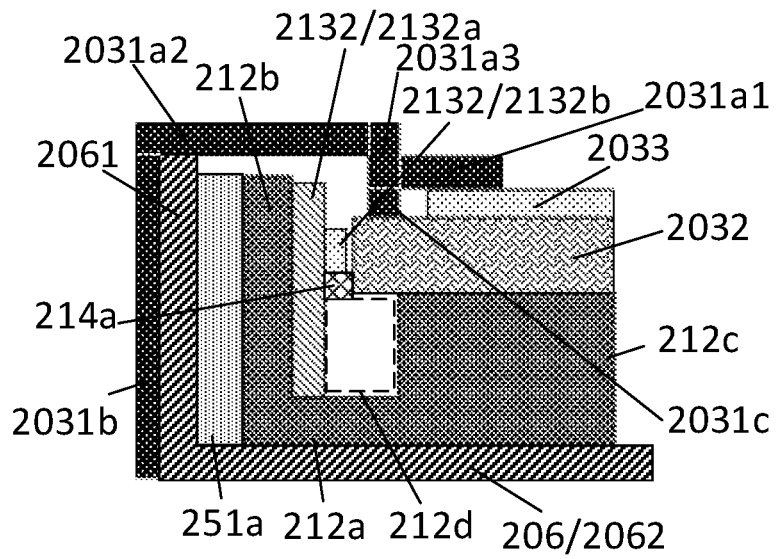
FIG. 7 is a schematic cross-sectional view of a backlight module at the side where a second backlight is located provided by an embodiment of the present disclosure.

For example, as shown in FIG. 1, FIG. 6 and FIG. 7, the backlight module 203 further includes a heat conduction component 212, the heat conduction component 212 includes a first sub heat conduction component 212a extending parallel to the second sub back plate 2062, and the first sub heat conduction component 212a is located between the second sub back plate 2062 and the light guide plate 2032; the heat conduction component 212 further includes a second sub heat conduction component 212b extending from the edge of the first sub heat conduction component 212a toward the display panel 202; the first sub heat conduction component 212a is attached to the second sub back plate 2062; the backlight source is provided on the side of the second sub heat conduction component 212b close to the light guide plate 2032.

For example, as shown in FIG. 1, FIG. 6 and FIG. 7, the heat conduction component 212 further includes a third sub heat conduction component 212c, the third sub heat conduction component 212c is located between the first sub heat conduction component 212a and the light guide plate 2032 and is respectively in contact with the first sub heat conduction component 212a and the light guide plate 2032; the third sub heat conduction component 212c may be used to provide support for the light guide plate 2032.

Preferably, the first sub heat conduction component 212a, the second sub heat conduction component 212b and the third sub heat conduction component 212c constitute an integrated structure.

For example, the material of the heat conduction component 212 includes a heat conduction metal, graphene, heat conduction silicone grease, etc., which is not limited by the embodiments of the present disclosure. Preferably, the material of the heat conduction component 212 includes aluminum.

For example, the heat conduction component 212 includes a first spacer part 212d located between the second sub heat conduction component 212b and the third sub heat conduction component 212c, and at least a part of the backlight source 213 is located in the first spacer part 212d.

For example, the surface of the third sub heat conduction component 212c away from the bottom plate 207 is in direct contact with the surface of the light guide plate 2032 close to the bottom plate 207, that is, the third sub heat conduction component 212c has a function of supporting the light guide plate 2032. This structural design can make the structure of the display device 20 more stable.

For example, the backlight source 213 is provided on the side of the second sub heat conduction component 212b close to the light guide plate 2032, and the light emitted by the backlight source 213 irradiates onto the light guide plate 2032, and then is transmitted to the display panel 202 through the optical film 2033 located on the side of the light guide plate 2032 close to the display panel 202, thereby providing backlight for the display panel 202. Specifically, the first spacer part 212d has the function of a reinforcing rib, which can increase the overall structural strength of the heat conduction component 212. Specifically, the circuit board of the backlight source 213 is located in the first spacer part 212d; the first spacer part 212d provides an accommodation space for the circuit board of the backlight source 213. Preferably, the backlight source 213 is fixed to the second sub heat conduction component 212b by a heat-dissipating adhesive tape.

For example, as shown in FIG. 6, the display panel 202 further includes a position limitation part 253 fixed to the second sub back plate 2062, the position limitation part 253 extends in a direction toward of the display panel 202. The first sub heat conduction component 212a includes a second spacer part 212e, and the position limitation part 253 extends into the second spacer part 212e for limiting the position of the heat conduction component 212.

For example, as shown in FIG. 6, the second spacer part 212e penetrates the first sub heat conduction component 212a in the thickness direction of the first sub heat conduction component 212a, and the heat conduction component 212 further includes a third spacer part 212f penetrating the third sub heat conduction component 212c in the thickness direction of the third spacer part 212f, and the second spacer part 212e and the third spacer part 212f are connected with each other; a part of the position limitation part 253 is located in the second spacer part 212e and a part of the position limitation part 253 is located in the third spacer part 212f.

For example, in at least one direction parallel to the plane where the second sub back plate 2062 is located, the width of the orthographic projection of the part of the position limitation part 253 located in the third spacer part 212f on the second sub back plate 2062 is larger than the width of the orthographic projection of the second spacer part 212e on the second sub back plate 2062, so as to limit the position of the heat conduction component 212 in the extension direction perpendicular to the second sub back plate 2062.

For example, in at least one direction parallel to the plane where the second sub back plate 2062 is located, the width of the second spacer part 212e is greater than the width of the part of the position limitation part 253 located in the second spacer part 212e. It can be understood that in the case that the width of the second spacer part 212e is greater than the width of the part of the position limitation part 253 located in the second spacer part 212e, an assembly space can be reserved for the position limitation part 253.

For example, the second spacer part 212e extends along one edge of the display panel 202 and penetrates through the heat conduction component 212, so that the heat conduction component 212 is divided into two independent parts. When the light guide plate 2032 expands due to heat, the light guide plate 2032 can push one independent part of the heat conduction component 212 to move (for example, one independent part of the heat conduction component 212 can be indirectly pushed to move by pushing the backlight provided between the light guide plate 2032 and the third sub heat conduction component 212c), so as to change the width of the second spacer part 212e. In this way, the light guide plate 2032 is always in a state of no active space in the direction of pushing one independent part of the heat conduction component 212 to move by the heat conduction component, which enhances the stability of the backlight module 203 and improves the reliability of the display device. Furthermore, in the field of medical display, especially for endoscopic display devices for surgery, high brightness of backlight is often required, which leads to a large thermal expansion of the light guide plate, the above-mentioned design can overcome the reliability problem caused by the large thermal expansion of the light guide plate.

Preferably, the display device includes a buffer part 255, the buffer part 255 is located between one independent part of the heat conduction component 212 and the first sub back plate 2061 on the corresponding side, for limiting the position of the one independent part of the heat conduction component 212 on the corresponding side, and meanwhile, the position filled by the buffer part 255 serves as an expansion space. When the light guide plate 2032 expands, the buffer part 255 can be compressed by pushing the independent part of the heat conduction component 212 on the corresponding side, and this design can improve the reliability of the display device.

Preferably, as shown in FIG. 1, the third direction is the direction from the sky side to the ground side of the display device. In the third direction, the width of the orthographic projection of the part of the position limitation part 253 located in the third spacer part 212f on the second sub back plate 2062 is larger than that of the orthographic projection of the second spacer part 212e on the second sub back plate 2062. Preferably, in the third direction, the width of the second spacer part 212e is greater than the width of the part of the position limitation part 253 located in the second spacer part 212e.

Specifically, the sky side of the display device may be understood as the upper side of the display screen when the display device normally performs the display operation; the ground side of the display device may be understood as the lower side of the display screen when the display device normally performs the display operation. Specifically, the sky side of the display device may also be understood as the side of the display device facing the sky when the display device is hung for use; the ground side of the display device may be understood as the side of the display device facing the ground when the display device is hung for use.

For example, as shown in FIG. 6, the second spacer part 212e extends along the direction parallel to the sky side of the display device and penetrates through the heat conduction component 212, dividing the heat conduction component 212 into two independent parts with variable relative positions close to the sky side and close to the ground side; for example, the display device includes a buffer part, the buffer part is located between the first sub back plate 2061 on the sky side and the third sub heat conduction component 212c corresponding to the sky side, and is used for limiting the position of the heat conduction component 212 on the sky side, and the position filled by the buffer part serves as an expansion space. When the light guide plate 2032 expands, the buffer part can be compressed by pushing the heat conduction component 212 on the sky side. This design can improve the reliability of the display device. Specifically, the material of the buffer part is an elastic material, for example, rubber.

Preferably, the distance between the second spacer part 212e and the sky side is smaller than the distance between the second spacer part 212e and the ground side, so as to prevent the light guide plate 2032 from wrinkling due to thermal expansion thus affect the display effect.

Preferably, as shown in FIG. 7, the second sub heat conduction component 212b corresponding to the ground side and the first sub back plate 2061 are fixed by a third adhesive 251a.

For example, as shown in FIG. 1, the backlight module 203 includes a light guide plate 2032 and a second sub back plate 2062, the second sub back plate 2062 is located on the side of the light guide plate 2032 away from the second sub back plate 2062; the backlight source 213 includes a first backlight source 2131 and a second backlight source 2132 respectively disposed at two opposite side surfaces of the light guide plate 2032. The display device further includes a sensor configured to detect the light brightness of emitted light of the backlight module 203.

Figure 5:
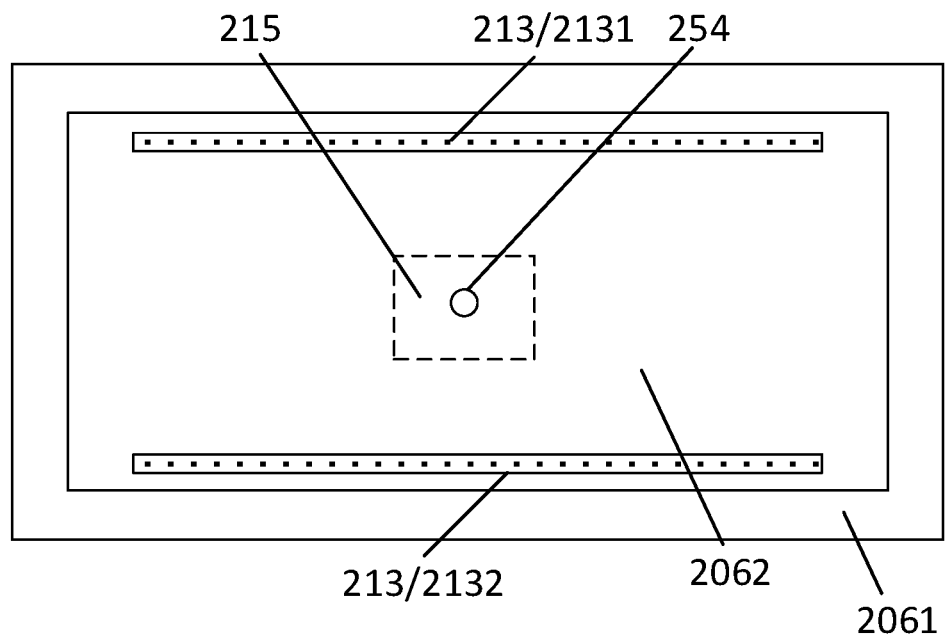
FIG. 5 is a schematic planar view of a backlight provided by an embodiment of the present disclosure.

For example, FIG. 5 is a schematic planar view of a backlight provided by an embodiment of the present disclosure. As shown in FIG. 5, the backlight source 213 includes a first backlight source 2131 and a second backlight source 2132 respectively arranged at two opposite side surfaces of the light guide plate 2032. With reference to FIG. 1 and FIG. 5, the first backlight source 2131 is disposed at the side surface of the right side of the light guide plate 2032 in the figure, although not shown in FIG. 1, the second backlight source 2132 is disposed at the side surface of the other side of the light guide plate 2032.

For example, as shown in FIG. 5, the center of the second sub back plate 2062 has a through hole 254 passing through the second sub back plate 2062, and the sensor 215 is arranged on the side of the second sub back plate 2062 away from the light guide plate 2032, so that the light emitted by the light guide plate 2032 can enter the sensor 215 through the through hole, thereby monitoring the brightness of the light guide plate 2032.

For example, as shown in FIG. 6, the first backlight source 2131 includes a first backlight circuit board 2131a and a first light source 2131b, the first backlight circuit board 2131a is attached to the side of the third sub heat conduction component 212c close to the light guide plate 2032, and the first backlight source 2131b is arranged on the side of the first backlight circuit board 2131a away from the third sub heat conduction component 212c; light emitted by the first backlight source 2131b enters the light guide plate 2032 and exits from the light exit surface of the light guide plate 2032.

For example, the backlight source 213 includes a backlight circuit board and a light emitting diode light source located at the side of the backlight circuit board close to the light guide plate. The display device includes a support column 214a, the support column 214a is located on the backlight circuit board and arranged against the light guide plate 2032 for limiting the position of the light guide plate 2032.

In a specific embodiment, the support column 214a is arranged between the first backlight circuit board 2131a and the light guide plate 2032, and the support column 214a is configured that a gap is provided between the first light source 2131b and the light guide plate 2032, which can accelerate the diffusion of heat, so as to control the temperature of the backlight module 203 within a proper range. When the light guide plate 2032 expands at a high temperature, the gap can also ensure the existence of a gap, and prevent the extrusion damage between the light guide plate 2032 and the first light source 2011b, thus keeping the optical uniformity of the display device 20 stable. In some embodiments, the support column 214 may also be fixed on the third sub heat conduction component 212c and disposed toward the light guide plate 2032.

For example, as shown in FIG. 7, the second backlight source 2132 includes a second backlight circuit board 2132a and a second light source 2132b, the second backlight circuit board 2132a is attached to the side of the third sub heat conduction component 212c close to the light guide plate 2032, and the second light source 2131b is arranged on the side of the second backlight circuit board 2132a away from the third sub heat conduction component 212c. The light emitted by the second backlight source 2132b enters the light guide plate 2032 and exits from the light exit surface of the light guide plate 2032.

In some embodiments, the support column is provided between the second backlight circuit board 2122a and the light guide plate 2032, and the support column is configured that a gap is provided between the second light source 2132b and the light guide plate 2032, which can accelerate the diffusion of heat, so as to control the temperature of the backlight module 203 within a proper range. When the light guide plate 2032 expands at a high temperature, the gap can also ensure the existence of a gap, and prevent the extrusion damage between the light guide plate 2032 and the second light source 2012b, thus keeping the optical uniformity of the display device 20 stable. In some embodiments, the support column may also be fixed on the third sub heat conduction component 212c and disposed toward the light guide plate 2032. The materials of the support columns corresponding of the first backlight source 2131 and the second backlight source 2132 may be the same.

For example, FIG. 5 is a backlight module of a display device provided by an embodiment of the present disclosure. As shown in FIG. 5, the display device further includes a sensor 215, the sensor 215 is configured to detect light brightness of light emitted by the backlight module. Specifically, the sensor 215 is disposed on the side of the second sub backplane 2062 away from the light guide plate 2032. The light guide plate 2032 includes a through hole passing through the light guide plate 2032, and the light from the light guide plate 2032 can enter the sensor 215 through the through hole to realize the detection of the light intensity of the multi-backlight module. Preferably, the through hole is disposed in the center of the second sub backplane 2062.

For example, in combination with FIG. 5, the first backlight source 2131 and the second backlight source 2132 are opposite to each other. For example, FIG. 6 is a schematic cross-sectional structure diagram of a backlight module at the side where the first backlight is located provided by an embodiment of the present disclosure, and FIG. 7 is a schematic cross-sectional structure diagram of a backlight module at the side where the second backlight is located provided by an embodiment of the present disclosure, in combination with FIG. 6 and FIG. 7, the second light source 2132b and the first light source 2131b are arranged opposite to each other.

Specifically, the second light source 2132b and the first light source 2131b are located at opposite sides of the light guide plate 2032; for example, the second spacer part 212e penetrates through the first sub heat conduction component 212c along the extending direction of the first backlight source 2131, and divides the heat conduction component 212 into two independent parts with variable relative positions; when the light guide plate 2032 expanded due to heat, because the light guide plate 2032 abuts against the support column 214a, the light guide plate 2032 can push one of the independent parts of the heat conduction component 212 to displace by the corresponding support column 214a on the corresponding side, so that the light guide plate 2032 is always in a state of having no movable space in the direction of pushing one of the independent parts of the heat conduction component 212 to move, so as to improve the reliability of the display device. Furthermore, in the field of medical display, especially for endoscopic display devices for surgery, high brightness of backlight is often required, which leads to a large thermal expansion of the light guide plate. This design can overcome the reliability problem caused by the large thermal expansion of the light guide plate.

For example, the first backlight source 2131 and the second backlight source 2132 are respectively arranged on the sky side and the ground side of the display device; specifically, the sky side and the ground side may respectively include a first spacer part 212*d* for respectively accommodating at least a part of the first backlight 213 and at least a part of the second backlight source 2132.

For medical display devices, especially those used in medical endoscopes, it is very important to ensure the brightness of the display devices. Using a sensor to detect the brightness of the backlight module and make the display device adjust the brightness in time can improve the reliability of the display device.

For example, during the use of the backlight source, there is light intensity attenuation, and the display device can judge whether it is necessary to enhance the light intensity of the backlight and the degree of enhancement according to the intensity of the light intensity signal obtained by the sensor 215.

For example, the way to change the light intensity of the light emitted by the backlight source may be modulating the duty ratio of the light emitting pulse of the light emitting chip of the backlight.

For example, in one example, the backlight includes two backlight sources that can be independently controlled, and in the case that one of the two backlight sources does not work, it can be detected by the sensor because the light intensity fed back to the sensor drops a lot. The display device is configured to automatically adjust the brightness of the other of the two backlight sources, so that the light emission of the display device 20 can reach a preset brightness (for example, the working brightness when the two light sources normally emit light).

Preferably, the first backlight source 2131 and the second backlight source 2132 are located on two opposite sides of the display device, such as the sky side and the ground side, respectively.

In a specific embodiment, as shown in FIG. 6 and FIG. 7, the first backlight source 2131 and the second backlight source 2132 can be independently controlled, and in the case that one of the first backlight source 2131 and the second backlight source 2132 does not work, it can be detected by the sensor. Because the light intensity fed back to the sensor drops a lot, and it can be detected by the sensor. The display device is configured to automatically adjust the brightness of the other one of the first backlight source 2131 and the second backlight source 2132, so that the light emission of the display device 20 can reach a preset brightness (for example, the working brightness when the two light sources emit light normally).

For example, as shown in FIG. 6 and FIG. 7, the first part 2031*a* includes a first sub part 2031*a*1 and a second sub part 2031*a*2, the first sub part 2031*a*1 and the second sub part 2031*a*2 are located in different planes; the second sub part 2031*a*2 is closer to the cover plate 201 than the first sub part 2031*a*1, and the first sub part 2031*a*1 is configured to support the display panel 202. The first sub part 2031*a*1 supports the display panel 202, which can save space and reduce the overall thickness of the display device 20.

For example, the plane where the first sub part 2031*a*1 is located and the plane where the second sub part 2031*a*2 is located are parallel to each other.

For example, a third sub part 2031*a*3 is further provided between the first sub part 2031*a*1 and the second sub part 2031*a*2, and the third sub part 2031*a*3 is connected with the first sub part 2031*a*1 and the second sub part 2031*a*2 respectively.

For example, the cross-sectional shape of the whole structure formed by the first sub part 2031*a*1, the third sub part 2031*a*3 and the second sub part 2031*a*2 is in a shape of folded line.

For example, in one embodiment, the projection of the first sub part 2031*a*1 and the second sub part 2031*a*2 on the plane where the light exit surface of the display panel 202 is located may not overlap.

For example, in one embodiment, the third part 2031*c* is connected with the third sub part 2031*a*3.

Preferably, the design of the display device needs to consider that in the case that one backlight source on one side does not work, the backlight source on the other side needs to independently support the display device to work, and the brightness is greatly increased. Therefore, the display device needs to include the heat conduction part 212 to cooperate with the backlight sources on the two sides to prevent heat accumulation in the case that only one backlight source works.

Figure 9:
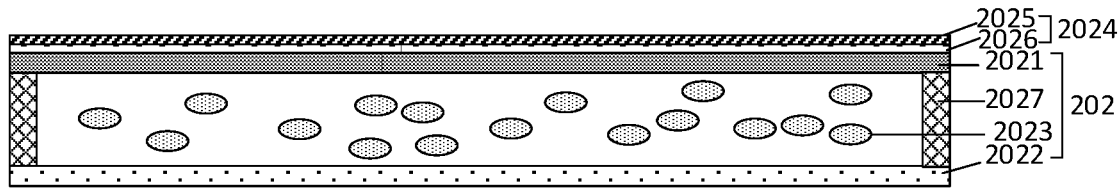
FIG. 9 is a schematic cross-sectional structure of a display panel provided by an embodiment of the present disclosure.

For example, FIG. 9 is a schematic cross-sectional structure of a display panel provided by an embodiment of the present disclosure. As shown in FIG. 9, the display panel 202 includes a color filter substrate 2021 and an array substrate 2022, and a liquid crystal layer 2023 sandwiched between the color filter substrate 2021 and the array substrate 2022, that is, the color filter substrate 2021 and the array substrate 2022 face each other and are separated from each other. The display panel 202 further includes a +A compensation layer and a +C compensation layer that are laminated, and the +A compensation layer is closer to the liquid crystal layer 2023 than the +C compensation layer. The display panel 202 further includes a first polarizer and a second polarizer. The liquid crystal layer, the +A compensation layer and the +C compensation layer are all located between the first polarizer and the second polarizer. The first polarizer 2024 is arranged on the side of the color filter substrate 2021 far away from the array substrate 2022. The first polarizer 2024 includes a first compensation layer 2025 and a second compensation layer 2026 that are laminated, and the first compensation layer 2025 is further away from the liquid crystal layer 2023 than the second compensation layer 2026. The first compensation layer 2025 and the second compensation layer 2026 jointly compensate for the phase delay of the light, and under the joint action of the first compensation layer 2025 and the second compensation layer 2026, the dark light leakage of the display panel can be obviously reduced, and the color shift at a large viewing angle can be obviously reduced, thereby improving the display effect of the display device, so as to meet the display requirements of display devices used in the medical field, especially medical endoscopic apparatuses.

For example, a plurality of gate lines and a plurality of data lines are formed on the inner surface of the array substrate 2022. The plurality of gate lines and the plurality of data lines cross each other to define the pixel regions, and a thin film transistor (TFT) is connected to both the corresponding gate line and the corresponding data line. The transparent pixel electrode in each of the pixel regions is electrically connected with the source electrode or the drain electrode of the thin film transistor. In addition, a black matrix covering the gate lines, the data lines and the thin film transistors is formed on the inner surface of the color filter substrate 2021, and a color filter layer including a red color filter, a green color filter and a blue color filter is formed on the black matrix, for example, a transparent common electrode is formed on the color filter layer.

For example, as shown in FIG. 9, a sealing pattern 2027 is formed in the edge part between the color filter substrate 2021 and the array substrate 2022. The sealing pattern 2027 is, for example, a frame sealing glue pattern to prevent the liquid crystal layer from leaking. For example, the sealing pattern 2027 is not limited to thermosetting frame sealing glue or ultraviolet curing frame sealing glue. An accommodation space is formed between the sealing pattern 2027 and the color filter substrate 2021 and the array substrate 2022, and the liquid crystal layer 2023 is arranged in the accommodation space.

For example, in one example, the first compensation layer 2025 is a cholesteric liquid crystal layer, and the second compensation layer 2026 is a base film formed of cycloolefin polymer.

Figure 10:
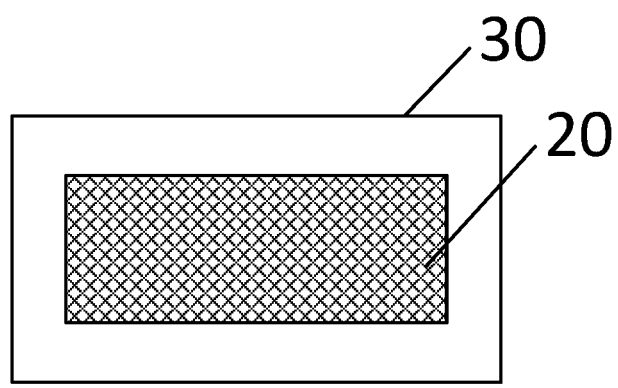
FIG. 10 is a schematic planar view of a medical endoscope apparatus provided by an embodiment of the present disclosure.

At least one embodiment of the present disclosure further provides a medical endoscope apparatus, and FIG. 10 is a schematic planar view of a medical endoscope apparatus provided by an embodiment of the present disclosure. As shown in FIG. 10, the medical endoscope apparatus 30 includes the display device 20 in any of the above embodiments.

The medical endoscopic apparatus provided by the embodiment of the present disclosure has the same technical characteristics and working principle as the above-mentioned display apparatus, and are not repeated in the embodiment of the present disclosure here.

The display device and the medical endoscopic apparatus provided by at least one embodiment of the present disclosure have at least one beneficial technical effect as follows:

(1) In the display device provided by at least one embodiment of the present disclosure, the iron frame is removed and the structural design of the middle frame is changed, thereby reducing the usage amount of glue and avoiding pulling the display panel, and further avoiding the problems of yellow spots, glue leakage, light leakage, poor antistatic ability and low light transmittance.

(2) In the display device provided by at least one embodiment of the present disclosure, the first part of the middle frame is arranged to be laminated with the optical film in the direction perpendicular to the main surface of the cover plate, and the third part of the middle frame is arranged on the side of the light guide plate close to the cover plate and is laminated with the light guide plate in the direction perpendicular to the main surface of the cover plate, so that the structure of the display device is more stable, so that in the case that the display device is used as an endoscopic display device for surgery, the pathological tissue of the patient can be accurately observed, and the accuracy and efficiency of surgery can be improved.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or narrowed, that is, the drawings are not drawn in a real scale.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A display device, comprising:
a display panel;
a cover plate at a light exit side of the display panel;
a backlight module, arranged at a side of the display panel away from the cover plate;
a middle frame, wherein
the middle frame comprises:
a first part, configured to support the display panel;
a second part, connected with the first part and extends from the first part to the side away from the cover plate; the second part is around the backlight module at side of the backlight module;
the display device further comprises a first space between the first part and the cover plate, a first side of the first space is limited by the cover plate, a second side of the first space is limited by the first part, the first side of the first space is opposite to the second side of the first space, and the first space is around the display panel;
a first adhesive layer is provided between the cover plate and the display panel, and an orthographic projection of the first adhesive layer on the cover plate covers an orthographic projection of a display area of the display panel on the cover plate;
the middle frame further comprises a third part, the third part is connected with the first part and extends from the first part to a side away from the cover plate, and the third part is closer to a center of the display device than the second part for limiting the backlight module;
a space is provided between the second part and the third part;
on a plane perpendicular to a main surface of the display panel, a cross-sectional shape of the first part and a cross-sectional shape of the third part constitute a shape of letter T, and the cross-sectional shape of the first part, the cross-sectional shape of the second part and the cross-sectional shape of the third part comprise an F-shaped part.

2. The display device according to claim 1, wherein a second space is further provided between the display panel and the cover plate, a first side of the second space is limited by the cover plate, a second side of the second space is limited by the display panel, the first side of the second space is opposite to the second side of the second space, and the second space is around the first adhesive layer; an orthographic projection of a peripheral area of the display panel on the cover plate covers an orthographic projection of the second space on the cover plate.

3. The display device according to claim 2, wherein the second space surrounds a circle of the first adhesive layer, and an average thickness of the first adhesive layer is in a range of [0.25 mm, 1.00 mm]; the thickness of the first adhesive layer is uniform everywhere.

4. The display device according to claim 1, further comprising an outer frame, wherein
the outer frame comprises a first support part and a second support part;
the first support part and the display panel are on a same side of the cover plate, and the first support part and a first edge of the cover plate are bonded by a second adhesive; the second support part is connected with a side of the backlight module away from the display panel;
the outer frame further comprises a main body part, the main body part is respectively connected with the first support part and the second support part, and the first support part and the second support part are respectively connected with the main body part and located at a same side of the main body part.

5. The display device according to claim 4, wherein the backlight module comprises a back plate, and the back plate comprises a first sub back plate and a second sub back plate that are connected with each other, and the backlight module further comprises a bottom plate, and the bottom plate is on a side of the second sub back plate away from the cover plate;
the second sub back plate is connected with the bottom plate through a first connection component, and the second support part is fixedly connected with the bottom plate.

6. The display device according to claim 1, wherein the backlight module comprises a back plate, and the back plate comprises a first sub back plate and a second sub back plate that are connected with each other, and the first sub back plate and the second part are immediately adjacent to each other.

7. The display device according to claim 6, wherein a bracket is on a side of the second sub back plate away from the cover plate, and a power board is on a side of the bracket away from the second sub back plate, and the bracket is configured to support the power board, and the power board is configured to drive the display panel to display.

8. The display device according to claim 7, wherein the bracket and the second sub back plate are connected through a second connection component, and the bracket has a first main surface, and the second sub back plate has a second main surface, and an entirety of the first main surface is in contact with the second main surface.

9. The display device according to claim 8, wherein an adapter plate is further provided between the bracket and the power board, and the adapter plate is fixed on the bracket and bears the power board; an orthographic projection of the power board on the second sub back plate is within an orthographic projection of the adapter board on the second sub back plate;
an electrostatic conduction path is formed between the adapter plate, the bracket and the second sub back plate.

10. The display device according to claim 8, wherein the second main surface of the second sub back plate is provided with a screw hole, the bracket is provided with a hole structure which is configured for a screw to pass through, and the second connection component is a combination of the screw and the screw hole.

11. The display device according to claim 1, wherein the backlight module comprises a light guide plate and a second sub back plate, wherein the second sub back plate is located at a side of the light guide plate away from the second sub back plate;
the backlight module further comprises a heat conduction component;
the heat conduction component comprises a first sub heat conduction component extending parallel to the second sub back plate, and the first sub heat conduction component is between the second sub back plate and the light guide plate;
the heat conduction component further comprises a second sub heat conduction component extending from an edge of the first sub heat conduction component toward the display panel, wherein
the first sub heat conduction component is attached to the second sub back plate;
a backlight is on a side of the second sub heat conduction component close to the light guide plate.

12. The display device according to claim 11, wherein the heat conduction component further comprises a third sub heat conduction component, the third sub heat conduction component is between the first sub heat conduction component and the light guide plate and is respectively in contact with the first sub heat conduction component and the light guide plate; the third sub heat conduction component is configured to support the light guide plate;
the heat conduction component comprises a first spacer part between the second sub heat conduction component and the third sub heat conduction component, and at least a part of the backlight is in the first spacer part.

13. The display device according to claim 11, further comprising a position limitation part fixed to the second sub back plate, wherein the position limitation part extends along a direction towards the display panel;
the first sub heat conduction component comprises a second spacer part, and the position limitation part extends into the second spacer part for limiting a position of the heat conduction component.

14. The display device according to claim 13, wherein the second spacer part penetrates the first sub heat conduction component in a thickness direction of the first sub heat conduction component;
the heat conduction component further comprises a third spacer part penetrating the third sub heat conduction component in a thickness direction of the third sub heat conduction component, and the second spacer part and the third spacer part are connected with each other;
a part of the position limitation part is in the second spacer part and a part of the position limitation part is in the third spacer part; in at least one direction parallel to a plane where the second sub back plate is located, a width of an orthographic projection of the part of the position limitation part in the third spacer part on the second sub back plate is greater than that of an orthographic projection of the second spacer part on the second sub back plate;
a third direction is a direction from a sky side of the display device to a ground side of the display device;
in the third direction, a width of the second spacer part is greater than a width of the part of the position limitation part in the second spacer part.

15. The display device according to claim 14, wherein the display device further comprises a buffer part, and the buffer part is between the first sub back plate which is on the sky side and the third sub heat conduction component corresponding to the sky side.

16. The display device according to claim 1, wherein the backlight module comprises a light guide plate and a second sub back plate, and the second sub back plate is at a side of the light guide plate away from the second sub back plate;

the backlight source comprises a first backlight source and a second backlight source which are respectively at two opposite side surfaces of the light guide plate;

the display device further comprises a sensor, and the sensor is configured to detect brightness of emitted light of the backlight module.

17. The display device according to claim 16, wherein a material of the back plate comprises aluminum; on the second sub back plate, a reinforcing rib is close to each side edge of the second sub back plate, and a shape of each reinforcing rib is a strip extending along a corresponding side edge of the second sub back plate, and adjacent reinforcing ribs are not in contact with each other.

18. The display device according to claim 1, wherein the first part comprises a first sub part and a second sub part, the first sub part and the second sub part are in different planes; the second sub part is closer to the cover plate than the first sub part; the first sub part is configured to support the display panel.

19. A medical endoscopic apparatus, comprising the display device according to claim 1.

\* \* \* \* \*